US009542580B2

(12) United States Patent
Lampe

(10) Patent No.: US 9,542,580 B2
(45) Date of Patent: Jan. 10, 2017

(54) RFID COMMUNICATION SYSTEM AND METHOD FOR CONTROLLING SAME

(71) Applicant: HARTING IT SOFTWARE DEVELOPMENT GMBH & CO. KG, Espelkamp (DE)

(72) Inventor: Marco Lampe, Versmold (DE)

(73) Assignee: HARTING IT SOFTWARE DEVELOPMENT GMBH & CO. KG (DE)

( * ) Notice: Subject to any disclaimer, the term of this patent is extended or adjusted under 35 U.S.C. 154(b) by 0 days.

(21) Appl. No.: 15/038,424

(22) PCT Filed: Dec. 10, 2014

(86) PCT No.: PCT/DE2014/100437
§ 371 (c)(1),
(2) Date: May 20, 2016

(87) PCT Pub. No.: WO2015/085993
PCT Pub. Date: Jun. 18, 2015

(65) Prior Publication Data
US 2016/0292471 A1    Oct. 6, 2016

(30) Foreign Application Priority Data
Dec. 12, 2013    (DE) .................. 10 2013 113 978

(51) Int. Cl.
*G06K 7/10* (2006.01)
*G06K 19/07* (2006.01)
*G06K 19/077* (2006.01)

(52) U.S. Cl.
CPC ....... *G06K 7/10217* (2013.01); *G06K 7/10198* (2013.01); *G06K 7/10227* (2013.01);
(Continued)

(58) Field of Classification Search
CPC ............ G06K 7/10198; G06K 7/10217; G06K 7/10227; G06K 7/10475
See application file for complete search history.

(56) References Cited

U.S. PATENT DOCUMENTS 8,402,308 B2    3/2013    Chae et al. ...................... 714/15
2005/0008828 A1    1/2005    Libera et al. ............... 428/195.1
(Continued)

FOREIGN PATENT DOCUMENTS

CN    101042724    9/2007    ............. G06K 17/00
EP    2423846    2/2012    ............... G06K 7/00
(Continued)

OTHER PUBLICATIONS

German Office Action issued in application No. 10 2013 113 978.7, dated Jun. 16, 2014 (7 pgs).
(Continued)

*Primary Examiner* — Michael G Lee
*Assistant Examiner* — Suezu Ellis
(74) *Attorney, Agent, or Firm* — Hayes Soloway P.C.

(57) ABSTRACT

Described herein is a system and method for the continuous operation of an RFID communication system in a user-friendly manner and to ensure the reliability thereof in a cost-effective manner by uploading and storing configuration data from each active reader into a memory of the management system. A control unit polls an activity status for each active reader at regular time intervals. In the event of an active reader failing, the control unit identifies the failed reader, loads the configuration data for the failed reader from a memory into a specified inactive reader, and activates the specified inactive reader in place of the failed reader to identify the at least one RFID transponder.

24 Claims, 9 Drawing Sheets

(52) U.S. Cl.
CPC ..... *G06K 7/10475* (2013.01); *G06K 19/0723* (2013.01); *G06K 19/0724* (2013.01); *G06K 19/07788* (2013.01)

(56) References Cited

U.S. PATENT DOCUMENTS

| | | | |
|---|---|---|---|
| 2005/0088284 A1 | 4/2005 | Zai et al. ................... | 340/10.2 |
| 2006/0022815 A1* | 2/2006 | Fischer ................ | G06K 7/0008 |
| | | | 340/505 |
| 2007/0229275 A1* | 10/2007 | Malik ................. | H01Q 1/2216 |
| | | | 340/572.7 |
| 2010/0214072 A1 | 8/2010 | Hong et al. .................. | 340/10.2 |

FOREIGN PATENT DOCUMENTS

| | | | | |
|---|---|---|---|---|
| EP | 1762960 | 10/2012 | ............... | G06K 7/00 |
| KR | 20120100583 | 9/2012 | ............... | H04B 5/02 |

OTHER PUBLICATIONS

International Search Report and Written Opinion issued in application No. PCT/DE2014/100437, dated Apr. 29, 2015 (11 pgs).
International Preliminary Report on Patentability issued in application No. PCT/DE2014/100437, dated Jun. 23, 2016 (7 pgs).

\* cited by examiner

RFID COMMUNICATION SYSTEM AND METHOD FOR CONTROLLING SAME

BACKGROUND OF THE INVENTION

A first aspect of the invention relates to an RFID communication system.

A second aspect of the invention relates to a method for controlling an RFID communication system.

BRIEF DESCRIPTION OF THE PRIOR ART

RFID communication systems having a plurality of read/write stations are known in the prior art. For instance document U.S. Pat. No. 8,451,096 describes an RFID read/write station that comprises a read/write apparatus having a transmitter, a receiver, a processor unit and at least one read/write antenna. According to this prior art, first monitoring tags in the read/write equipment and second monitoring tags in the antennas are used to monitor all components in each read/write station to check that they are working properly. This dispenses with the need to interconnect the RFD components.

Document U.S. 2005 008 828 4 A1 discloses an RFID system which comprises a network for a plurality of RFID readers that is used to provide a large coverage area.

Document EP 1 762 960 B1 discloses a synchronization method for multi-technology/multi-frequency RFID reader arrangements.

Document EP 2423846 A2 describes a method for operating a system comprising two readers, which are active simultaneously for a certain time interval during which they exchange between each other data received from an electronic tag in order to generate two identical copies of the received data. The aim here is to increase the operating life of the readers and avoid data loss.

It is also known in the prior art to link RFD readers to one another by means of middleware. The readers have different antennas in different positions. Each reader normally has a distinct configuration. U.S. Pat. No. 8,402,308 describes an apparatus and a method for failure management of an RFID middleware system. The apparatus comprises a plurality of RFID readers, a plurality of RFID middleware components and a middleware control system for detecting a device failure. The control system is used to restart the RFID middleware or to redistribute tasks in order to stabilize the RFID middleware.

A disadvantage in the prior art is that the redundancy of known systems is associated with high technical complexity and correspondingly high costs. According to the currently known prior art, in order to safeguard automatically against failure, each reader must be assigned at least one redundant reader that is configured such that it can replace the associated reader in the event of it failing. The reliability of the RFID communication systems used here is not sufficient for many applications. This applies particularly to critical processes, for instance in medical technology. For reasons of cost and for lack of a sufficiently ergonomic RFID communication system, it is current practice, for instance in industry, to use RFID readers often without redundancy or with too little redundancy, and for instance when they fail, to replace RFID readers by hand with substitute readers, each of which must be suitably pre-configured manually, resulting in a large amount of work and commensurate downtimes and costs.

SUMMARY OF THE INVENTION

The object of the invention is to ensure the continuous operation of an RFID communication system in a user-friendly manner and to ensure the reliability thereof in a cost-effective manner.

The invention is based on the idea of providing a plurality of readers, which can be arranged physically in the form of modules in a subrack system. In addition, a management system is provided, which comprises a memory, in particular a program/data memory or, for instance, additionally also a separate temporary memory, and comprises a management data bus, via which the management system is in bidirectional data communication with the readers. The memory may preferably be a flash memory, so for instance a flash program/data memory and/or a flash temporary memory. In the memory are additionally stored, amongst other information, the configurations of the active readers in the form of configuration data. In addition, for example, at least parts of the operating software for the active readers in the normal state are stored both in the active reader concerned and in the memory of the management system, and hence are duplicated in the RFID communication system. Moreover, management software can advantageously be stored in the memory, in particular in the program/data memory, of the management system.

The management system advantageously manages the configuration of the individual readers centrally, for instance by means of a control unit which comprises in particular a reader-selector module. Hence each reader, in particular after it fails, can be replaced quickly by another reader by its configuration data being transferred from the program/data memory onto a previously inactive reader by the management system, and in particular by the control unit. The control unit then activates the inactive reader, which from now on assumes in the RFID communication system, both on the input side and the output side, the role that the now failed reader previously held. One means of facilitating this is by flexible "routing", i.e. by a digital routing matrix of the management system, which routing matrix is used to connect to one another or disconnect from one another the inputs and outputs of the components of the RFID communication system, provided this is technically feasible in terms of the data involved.

The routing matrix can be designed as a discrete hardware component. It can, however, also be purely software, in particular it can be part of a piece of management system software, i.e. part of software for the management system.

The configuration data contains a large number of technical parameters, which are known to a person skilled in the art, for instance the antenna output power, the selected frequency range, the "listen before talk" function or even the number of antennas used by the reader concerned, etc.

On activation, the just activated reader is thus connected, for example, on the input side to the antenna(s) that was/were previously connected to the now failed reader. On the output side, the new reader can be routed via the routing matrix from now on to those inputs of the components to which previously the now failed reader was connected, for instance to the relevant inputs of a data port of the control unit, and can hence fully replace the failed reader also in the signal flow.

As soon as the hardware of the failed reader is replaced by the hardware of a new reader, i.e. a new reader is physically substituted for the faulty reader, this information can be notified to the management system via a suitable interface, for example by an external operating control or by connecting a laptop or the like, and incorporated in the management system software, for instance, with the result that the new reader assumes the role of an inactive (redundant) reader in the RFID communication system, i.e. is handled by the management system initially as an inactive reader.

For example, an RFID communication system of the type in question is provided for identifying and/or detecting an instantaneous location of at least one RFID transponder in a specified area and comprises for this purpose at least one base station, which is suitable, inter alia, for generating an electromagnetic supply field for at least one RFID transponder in the specified area. The RFID transponder is used here to transmit an identification signal at a specified communication frequency, and the base station is additionally used to receive this identification signal. In addition, the base station comprises at least one active reader for generating an output signal according to the identification signal from the RFID transponder, and at least one inactive reader.

According to the invention, an RFID communication system of the type in question can be developed further by the at least one base station additionally comprising the control unit, which is designed, for example, to deactivate the or an active reader and additionally also to activate the or an inactive reader, for instance on the basis of at least one specified system parameter, and comprising the memory, which is used to store temporarily configuration data and to output the configuration data to the activated reader on or after activation by the control unit.

As already mentioned, the memory may be a temporary memory specifically provided for the purpose. It is also possible, however, for it to be the program/data memory, which can also contain other data, for instance program instructions, in particular the management system software and/or, if applicable, additional system data for the management system. It is immaterial here whether the memory is an external memory, which is in bidirectional data communication with a control system of the RFID communication system via an interface, or whether it is an internal memory, which may be an integral part of the control unit, for instance. For example, a processor can be responsible for executing the program instructions stored in the program/data memory, in particular using any further system data for the management system likewise stored in said memory. Such execution can consist in, for example, polling the activity status of the active readers at regular time intervals, and in the event of an active reader failing, identifying this reader and loading the associated configuration data for the identified failed reader from the memory, for example from the program/data memory or from a dedicated temporary memory, into an inactive (redundant) reader, and activating this redundant reader while also performing the above-described routing, with the result that this previously redundant reader replaces the failed reader by now serving as the active reader and, for example, being used instead of the failed reader to identify the at least one RFID transponder. Thus in this case, the processor together with the memory, in particular the program/data memory, assume the role of the control unit and in particular also the role of the reader-selector module. Alternatively, however, such a reader-selector module can also be designed on the basis of a separate hardware component that has its own processor. The entire control unit can also be designed on the basis of a discrete hardware module and as such can likewise be a part of the management system.

The corresponding modular design in the form of individual units and modules is particularly advantageous for low-cost and flexible customization of such a management system. In comparison, having a central processor and a central memory in an integrated hardware environment has cost benefits when producing large numbers of identical parts.

Such a reader-selector module is advantageously connected via a reader-selector bus to the active and inactive readers, in particular in order to be able to activate or deactivate the readers via said bus if required. This is particularly advantageous because it is thereby possible for the management system to determine centrally whether the readers are operating.

In particular it is hence a particularly great advantage that the plurality of active readers can be (and usually also are) configured differently from one another, something which is needed and useful in routine practice and is generally known to a person skilled in the art. It is exactly for these differently configured readers that the solution according to the invention allows a particularly high degree of reliability for each reader while having said low redundancy, i.e. with the low additional hardware complexity achieved by the invention. This is especially advantageous because it saves costs.

In a preferred embodiment, the number of inactive readers is less than the number of active readers. In particular, just a single inactive (redundant) reader is sufficient to safeguard any number of active readers.

This has the advantage that a level of redundancy sufficient for most cases is actually provided with relatively low hardware complexity, reducing the costs of such an RFID communication system. In this case, in normal operation, each of the active readers is automatically safeguarded against a failure even when only a single inactive reader is available as a substitute for each of the active readers. After a failure, however, the hardware of the failed reader must be replaced as quickly as possible with new operational reader hardware, which thereupon assumes the role of the inactive (redundant) reader, thereby restoring the original redundancy.

Embodiments are also possible, however, in which the number of active readers equals the number of inactive readers, for instance, or even exceeds this number. Of course even in these cases, the ratio between the high degree of reliability achieved by the invention and the hardware complexity needed to achieve this reliability is advantageous over the known prior art owing to the flexibility with which the inactive (redundant) readers can be used.

Some examples of such special cases are described below for a number n of inactive (redundant) readers and m active readers:

n=1 and m>1: any one active reader can be replaced automatically in the event of a failure, but before another active reader fails, the failed reader must be replaced manually by a new reader, although the new reader does not need to be configured by hand. This variant is particularly cost-effective.

n<m: any n active readers can fail and be replaced automatically before at least one of said readers must be replaced with a new reader manually. This variant allows the level of redundancy to be tailored to the given application and hence allows particularly advantageous customization to suit the given economic and technical circumstances.

n=m: all the active readers can fail simultaneously or before the replacement process and be substituted automatically. This is particularly advantageous for applications in which a total failure is possible and must be safeguarded against.

n>m: even after a total failure of all the active readers there is still a redundancy of n−m, and therefore any active reader also continues to be safeguarded before manual replacement takes place. For instance for the case n=m+1, even after a total failure of all, i.e. m, active readers and automatic substitution of said readers commensurately by n=m redundant readers, each of the active readers is safeguarded against a further failure by the one remaining redundant reader. This is particularly advantageous for applications in which after a total failure, immediate manual access is not possible or not wanted, for example when used in inaccessible locations, in deep-sea situations, in space, in nuclear power stations and storage facilities and in laboratory areas without continuous access, to name just a few examples.

Hence each of these cases compared with the prior art provides a considerable increase in the reliability for practically the same hardware complexity and hence constitutes an advantage.

It is also particularly advantageous if the readers are arranged physically in the form of modules in a racking system, first because this makes it easier to replace failed readers with new readers by hand, and second because this allows additional redundant readers to be added to the RFID communication system. For example, if it is required to increase the redundancy from n<m to n=m, for instance, then this can be done in a particularly user-friendly and cost-effective manner by inserting m−n modules since the existing hardware does not need to be replaced but can be expanded by modular means. This modular extensibility plays a particular role in practice, specifically when a system needs to adapt to a growing structure that is increasingly prone to failures, for example when an export-oriented company is expanding into new technologies, when the quality and/or quantity from a production line is being increased, when new departments, which may be particularly sensitive, are being added to a hospital, or an online business is attracting new business sectors, to name just a few example applications. The invention allows such an RFID communication system, once it has been configured initially in a one-off process, to grow with such structures by adding modules with only the minimum of manual effort and ideally even without additional programming effort. At the same time, the existing and proven parts of the system do not need to be modified. Thus in principle, continuous operation is guaranteed even during such an expansion, which is particularly advantageous especially for economic reasons.

A modular design of this type having an associated management system can have another advantage in that the hardware and in particular the inputs and outputs, i.e. the "ports", of the individual readers can be configured as required, even between one another, i.e. an active reader can use the inputs and/or outputs of another active reader by the associated data being routed thereto by means of the management system. Thus if required, modular expansion of the function of such a system is also possible, e.g. the system can use the signal data received by an antenna of a different reader which, for instance, is able to operate in a different frequency range. This obviously constitutes an additional advantage. In particular in this case, the base station thus transfers signal data from the at least one RFID transponder between at least two active readers.

Another advantage is that, if required, the hardware of such a system can be upgraded economically by adding individual modules, for example in order to achieve a higher transmit power, a larger coverage area, greater redundancy and/or a larger number of inputs and outputs.

At the same time, it is possible to make optimum use of the available resources for the following reasons:

First, the management system can handle all the inputs and outputs as required. Hence unused ports of an active reader can be used by another active reader.

Second, only a single inactive reader needs to be kept in reserve in order to be able to be used as a substitute for one of the plurality of active readers. In this regard, the invention allows the system to have minimum redundancy, i.e. maximum reliability is achieved with minimum hardware complexity, which additionally can also still be expanded by modular means.

Preferred embodiments of the RFID communication system according to the invention provide as an additional feature or as a combination of additional features, where technically feasible and practical, that:

the base station comprises at least two inactive readers, and the control unit is designed to activate the at least two inactive readers in a specified sequence;

The control unit is designed to activate the or an inactive reader before deactivating the or an active reader, with the result that at least two readers are active during a specified period, wherein the base station outputs the output signal only from one of these two active readers;

one input is provided for an external switching signal as a system parameter;

the external switching signal indicates a change in the specified communication frequency;

the external switching signal indicates a change in an operating program version for one or more of the readers;

a heartbeat signal is provided as a ready signal from relevant components, for example from the readers and in particular as an activity status of the active readers;

the control unit comprises at least one GPIO port for outputting at least one output signal to one or more output devices according to the identification signal from the at least one RFID transponder and/or for transferring operating software to inactive readers;

the GPIO port has eight contacts, which form a logic channel.

Preferred embodiments of the method according to the invention for an RFID communication system provide as an additional feature or as a combination of additional features, where technically feasible and practical, that:

the control unit activates at least two inactive readers in a specified sequence;

activation of the or an inactive reader is performed before deactivation of the or an active reader, with the result that two readers are active during a specified period, wherein the base station outputs the output signal only from one of these two active readers;

an external switching signal is polled as a system parameter;

the external switching signal indicates a change in the specified communication frequency;

the external switching signal indicates a change in an operating program version for one or more of the readers;

as a system parameter, a ready signal from relevant components, for instance from the readers, and in particular an activity status of the active readers, is polled or actively sent, wherein said ready signal is in particular a heartbeat signal;

as a further step, via at least one GPIO port, at least one output signal is output to one or more output devices according to the identification signal from the at least one RFID transponder and/or operating software is transferred to inactive readers;

the GPIO port has eight contacts, which form a logic channel.

One of the advantages of the invention is that in addition to ensuring continuous operation it provides greater flexibility in the configuration of the components. In particular there is greater flexibility in how the inputs and outputs of the RFID communication system can be configured and hence effectively a greater number of said inputs and outputs for practically the same hardware complexity.

BRIEF DESCRIPTION OF THE DRAWINGS

An exemplary embodiment of the invention is described in more detail below and is shown in the drawing, in which:

FIG. 1 b,c,d show a partial view of an alternative embodiment incorporating a routing matrix for the process of a reader failing and being replaced;

Some of the figures contain simplified, schematic diagrams. The same reference signs are sometimes used for the same but possibly not identical elements. Different views of the same elements might be to different scales.

DETAILED DESCRIPTION OF THE INVENTION

Figure 1A:
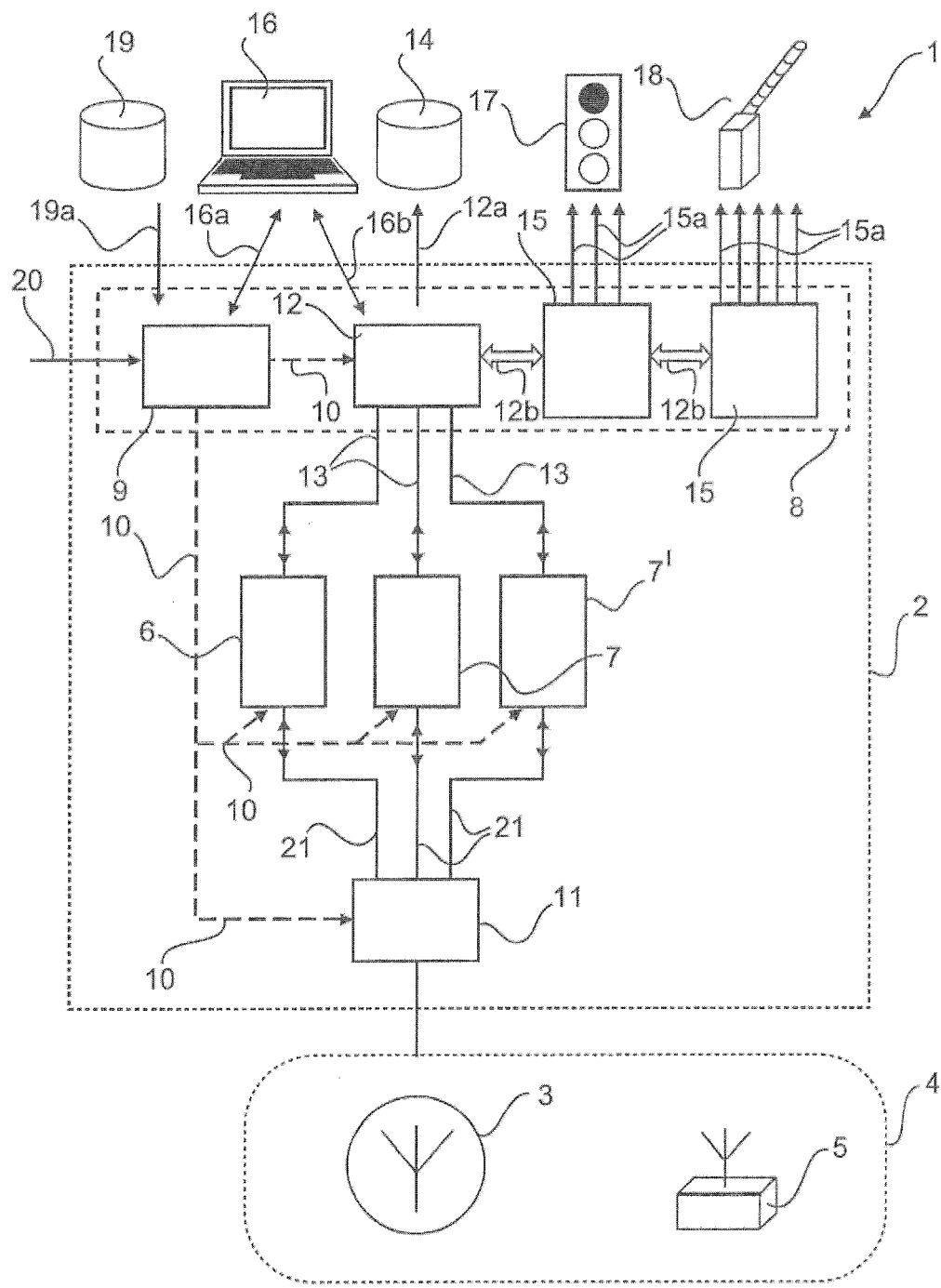
FIG. 1 a shows schematically an embodiment of the RFID communication system according to the invention.

FIG. 1 shows the essential components of a first embodiment of an RFID communication system 1 having a management system. A base station 2 supplies an antenna 3 with communication signals and/or reads signals from an RFID transponder 5 received via the antenna 3, processes said received signals and, for instance after conditioning, forwards said signals to the operator of the RFID communication system 1 and/or provides corresponding signals and/or data at its ports 15a.

The antenna 3 is designed here such that both its transmit power and its receiver sensitivity are sufficient to cover a specified communication area 4. In the communication area 4, each RFID transponder 5 is supplied with power by a supply field radiated by the antenna 3, so that the RFID transponder can output an identification signal which the base station 2 and the higher-level application software can use to identify said transponder. A plurality of built-in readers are provided in the base station 2 for reading the identification data from the RFID transponder 5 and for conditioning and forwarding this data. According to the present embodiment, only one of the plurality of readers is active. It is denoted by 6 in FIG. 1. In addition in this diagram are provided further readers 7, but these readers are inactive and not participating in the communication in the area 4. The inactive readers 7 constitute a back-up for the active reader 6 in case this reader is switched off by the operator or fails because of a fault. Hence the redundancy of this system is particularly high.

A control unit 8 is used to activate and deactivate the relevant readers 6, 7, 7' and to analyze the output signals. In the embodiment shown in FIG. 1, the control unit 8 comprises a plurality of separate components. In this embodiment, the active reader 6 is selected by a reader-selector module 9. For this purpose, said reader-selector module 9 is connected via a reader-selector bus 10 to all the readers 6, 7, 7' and to an antenna switch 11. It is also connected via the reader-select bus 10 to a data port 12. The reader-selector module 9, via the bus 10, instructs each of the readers 6, 7, 7' to switch into the active or into the inactive state. This ensures that at least one reader is active. In addition, the reader-selector module instructs the data port 12 to read only the active readers 6 and to ignore the inactive readers 7, 7'.

Furthermore, the reader-selector module 9 controls the antenna switch 11 via the reader-selector bus 10 such that the antenna 3 is connected to the currently active reader 6 and hence said reader is also supplied with relevant signals from the monitored area 4.

Alternatively, in an embodiment which is not explicitly shown in FIG. 1a, the base station 2 comprises a plurality of active readers 6, 6', 6", . . . and in particular actually more active readers 6 than inactive readers 7, so for example only one inactive reader 7 and a plurality of, for instance two, active readers 6, 6'. In such an embodiment, each active reader 6, 6' is provided with at least one associated antenna 3 and a monitored area 4 specifically associated with the particular reader, which areas 4 do not overlap one another in order to avoid multiple detection of a specific RFID transponder 5.

In particular this embodiment can make it possible, for instance by flexible routing via the management system, for the one inactive reader 7 to safeguard said plurality of active readers 6. In addition for this purpose, the configuration data for all the active readers 6 is stored in the memory, in particular the program/data memory 19. The management system here comprises a memory, in particular the program/data memory 19, and additionally the antenna switch 11 and the data port 12. The memory, in particular the program/data memory 19, can in this embodiment be arranged externally, as shown in FIG. 1, and hence can communicate with the control unit 8 of the base station 2 e.g. via an interface and a memory bus 19a. On the other hand, the program/data memory 19 may also be an integral part of the base station 2 and in particular of the control unit 8. Needless to say, the management system requires at least one processor to execute the program instructions, which are stored in the program/data memory for instance. In the present case, the at least one processor is a component of the base station 2, for example of the control unit 8, and in particular is a component of the reader-selector module 9.

If one of the active readers 6 fails, the associated configuration data is transferred from the memory, in particular from the program/data memory 19, into one of the inactive (redundant) readers 7. In addition, this reader is activated by the reader-selector module and is hence converted from an inactive reader into an active reader. It is thereby possible to safeguard a plurality of differently configured active readers by a single inactive (redundant) reader. This allows a reduction in the hardware complexity and saves costs.

The inactive reader 7 is hence able to replace any one currently failed active reader 6, 6' if required. Hence also the plurality of active readers 6, 6' can be safeguarded by a smaller number of inactive (redundant) readers 7, i.e. using relatively low hardware complexity.

The readers 6, 7', 7" are connected via dedicated data lines 13 to the data port 12. The readers 6,7,7' are connected by their respective outputs 21 to the antenna switch 11. In an advantageous embodiment, a routing matrix 100 of the management system, which routing matrix is shown in detail in the following FIG. 1 b,c,d, is located at these points, specifically a first part 101 of the routing matrix is located between the readers 6,7,7' and the data port 12, and a second part 102 between the antenna 3 and the readers 6,7,7', the function of which routing matrix 100 corresponds to the antenna switch 11 shown in this diagram. Needless to say, the routing matrix 100 can also comprise further parts located at other points in the signal flow. It is also obvious to a person skilled in the art that outputs can be routed to inputs naturally only when this is technically appropriate in terms of the data involved, i.e. the data is in the same format, for instance.

The data port 12 transmits via its output bus 12a the data from the active reader 6 to an external database 14 on which suitable analysis software is running. The control unit 8 can also transfer the RFID data from the active reader(s) 6 to other devices apart from a middleware device 14 of this type. Alternatively or additionally, the data port 12 is hence connected via a suitable internal bus 12b to a multipurpose interface 15, which in turn controls various input and output devices. The connection 12b between the data port 12 and the multipurpose interface 15 is indicated by a double-ended arrow in FIG. 1. The multipurpose interface 15 is preferably a GPIO (general purpose input/output) port. Such a GRID port 15 comprises a plurality of output contacts 15a, typically eight contacts, which can be polled or assigned individually or can be addressed jointly as a logic channel. The two GPIO ports 15 are shown by way of example in FIG. 1 to have three and four contacts 15a respectively. As examples of input and output devices that can be served from the or a plurality of GPIO ports 15, FIG. 1 shows an access control 17, indicated by a traffic light, and a blocking mechanism 18, indicated by a barrier. Further GPIO ports 15 can be added, as indicated in FIG. 1.

Electrical signals are output via the GPIO port(s) 15. In addition, suitable interfaces can be used also to output data to other output units or to upload data into the system. This particular case arises when the software of individual components such as firmware of the readers 6 or the application software of the control unit 8 is due to be updated. This updated software, for example, can be stored on the external program/data memory 19 and then imported via the dedicated memory bus 19a into the system. The current operating software of the active readers 6, or at least the parts relevant to the configuration of said readers, can then be stored temporarily as configuration data in a memory, e.g. in an internal memory of the reader-selector module 9 or in the program/data memory 19 or a temporary memory 35 not shown in this FIG. 1, and uploaded to an inactive (redundant) reader 7,7' when required. The command to update the firmware is given in particular via an external switching input 20 of the base station 2. In this case, a simple electrical signal can be applied to the switching input 20, or even a digital signal, which can be polled via a data bus, for example.

Of course other commands can also be transferred to the base station 2 via the external switching input 20. For example, the base station 2 can thereby be taken from an idle state into an operating state. To give an example, a vehicle drives up to a barrier of a company site where access control is in operation. A light barrier detects the vehicle. Alternatively, an induction loop recessed into the ground can transmit a switching signal to the base station 2 and hence to the active reader 6, whereupon the reader is initiated to read the identification signal from the RFID transponder 5.

The base station 2 is placed in standby by the induction loop or the light barrier, with the result that the active reader 6 receives signals from the antenna 3 and reads the RFID transponder 5 of the vehicle. The vehicle authorization is checked. The reader 6 outputs to the connected output devices via the data port 12 and the GPIO port 15 the signal for switching over the traffic light 17 and for opening and closing the barrier 18. Reception is informed via another output device, e.g. the client computer 16. In particular it is possible to display on the client computer 16 at Reception the command applied as a system parameter to the external switch input 20. For this purpose, the client computer 16 is connected directly to the reader-selector module 9 via a first bus 16a and to the data port 12 via a second bus 16b.

It is obvious to a person skilled in the art that the above-described data buses 12a, 16a, 16b, 19a, 20 can also be combined to form a single network bus, e.g. an Ethernet bus. Thus for reasons of clarity, the drawing does not show all the data buses and associated reference signs.

Since a plurality of outputs are available via the GPIO port 15, it is possible to use commercial and hence comparatively low-cost readers to produce a configuration that is capable of implementing complex procedures. In particular, routing the inputs and outputs is more flexible than in the prior art when controlling procedures in this way. Should one GPIO port 15 not be sufficient then further GPIO ports 15 can be added, as shown or suggested in FIG. 1.

Figure 1B:
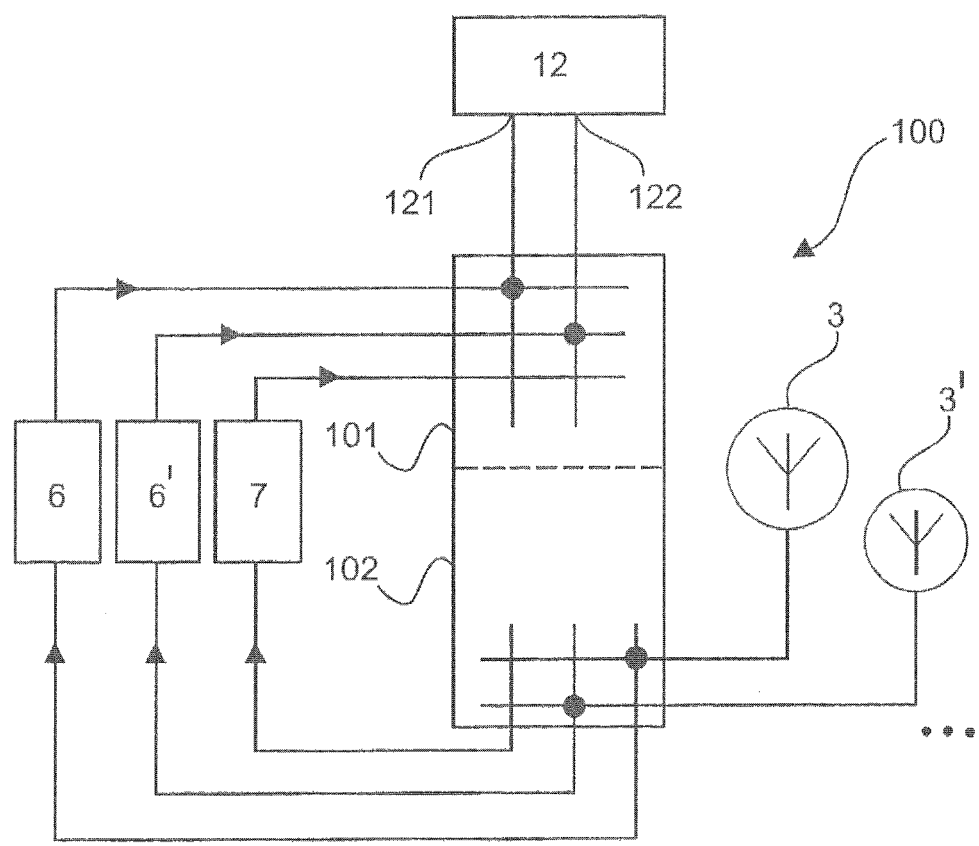
Figure 1C:
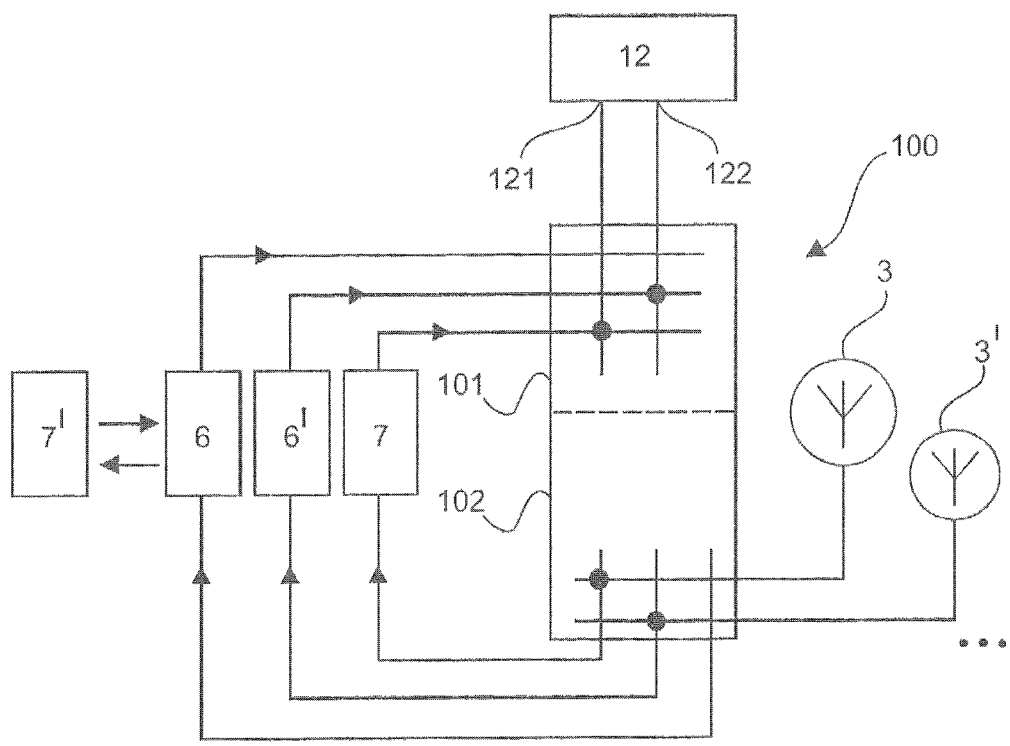
Figure 1D:
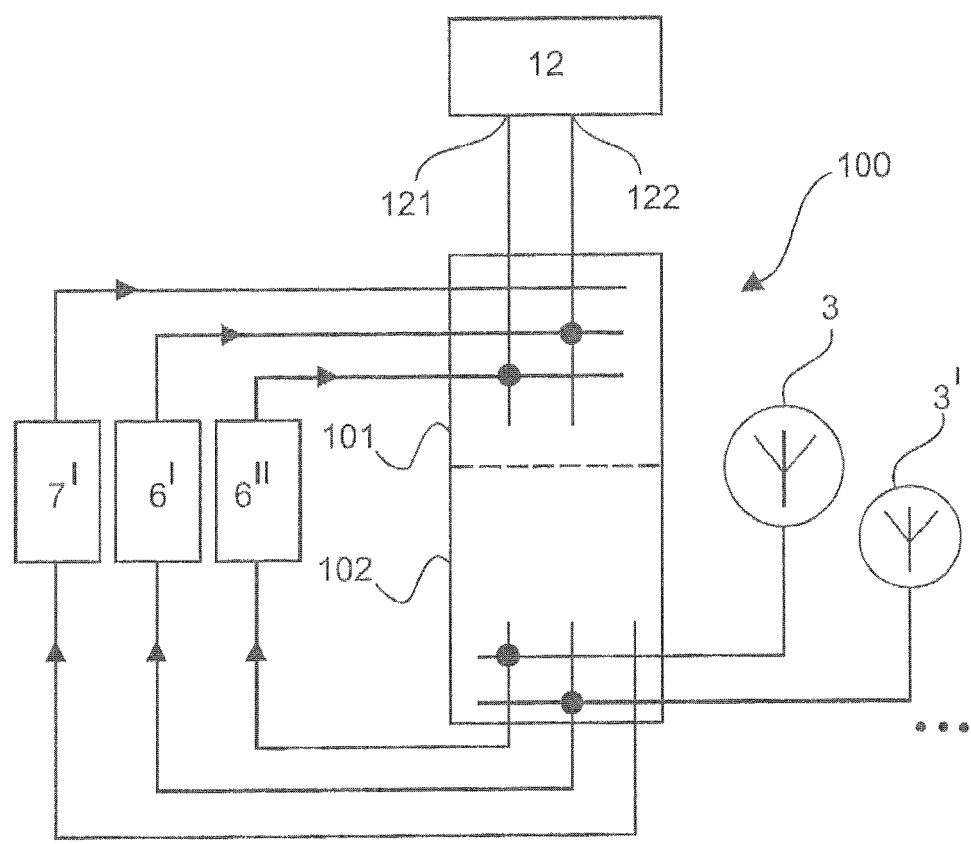

FIG. 1b, FIG. 1c and FIG. 1d show a partial view of the embodiment described above, which is not shown in full in FIG. 1a, each comprising one inactive reader 7,7' and two active readers 6,6',6" and incorporating a routing matrix 100, as indicated, which comprises a first part 101 for the output signals from the readers 6,6',6",7,7' and a second part 102 for the output signals from the antennas 3,3'. In the figures, each routing connection is shown by a dot at the intersection of two signal paths.

It is obvious to a person skilled in the art that such a routing matrix can also comprise further parts provided this is technically feasible in terms of the data involved.

FIG. 1b shows two active readers 6,6', namely a first active reader 6 and a second active reader 6', and one inactive reader 7. The antenna inputs of the two active readers 6,6' are connected to the outputs of the antennas 3,3' via the second part 102 of the routing matrix 100. The outputs of the active readers are connected to two inputs 121, 122 of the data port 12 via the first part of the routing matrix. The corresponding inputs and outputs of the inactive reader 7 are not routed, however. This diagram corresponds to the normal state.

FIG. 1c shows the situation when the first previously active reader 6 fails. This diagram does not show how the previously inactive reader 7 receives in the form of a data transmission the configuration data of the failed reader 6 from the management system. This diagram does show particularly clearly, however, how the previously redundant reader 7 is incorporated in the signal flow by its inputs and outputs via the routing matrix 100 in order to replace the previously active reader 6. The first previously active reader 6 is now no longer routed and hence no longer needed in the signal flow, and can now be replaced by a new redundant reader 7'. This substitution works regardless of which of the two active readers 6,6' has failed, which is obvious from the fact that by means of suitable routing, the second active reader 6' could also have been replaced by the inactive reader 7 in the same manner. Hence safeguarding a plurality of active readers 6,6' against failure is provided even with very low redundancy, namely using just one redundant reader 7.

FIG. 1*d* basically shows a normal state again, in which the newly added reader 7' is inactive, i.e. assumes the role of the redundant reader 7. At the same time, by being activated by the management system and in particular by the reader-selector module 9, the previously redundant reader 7 assumes the role of the first active reader 6 and can now be referred to as the (third) active reader 6".

Furthermore, the function of the new redundant reader 7' and the third active reader could now be swapped over again in order to return again to the initial situation shown in FIG. 1*b*.

Ideally, the functionality of the RFID communication system 1 was not affected during the failure, because the failure was detected quickly and the redundant reader was hence available after just a short configuration period.

In order to be able to identify such a failure as quickly as possible, a heartbeat bus 22 can be provided, for example, which is described below.

Figure 2:
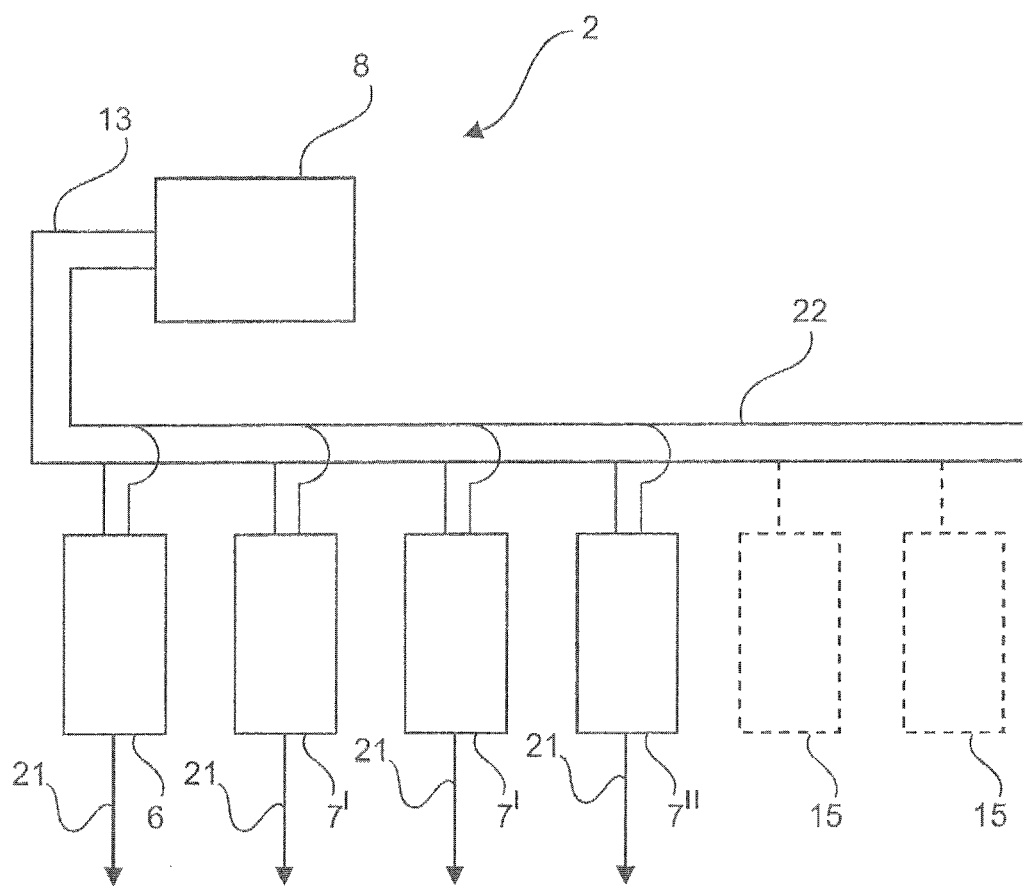
FIG. 2 shows schematically another embodiment of the base station of the RFID communication system according to the invention.

FIG. 2 shows in this regard a further embodiment of the base station 2. In this embodiment, a check that relevant components of the RFID communication system 1 are operational is made via a heartbeat bus 22. The components, in particular the active readers 6, although possibly also the inactive readers 7 or even other components of the RFID communication system 1, send out ready signals, in particular "heartbeat signals", at regular intervals on the heartbeat bus 22, which are received and analyzed by the control unit 8. The active readers 6 can thereby notify the control unit about their activity status, for instance, since they cease operating as active readers if they have failed. As soon as a ready signal from the active readers 6 or even from other components of the RFID communication system 1 is not received or not received on time, the control unit 8 sets off a corresponding alarm signal, which is used to inform the operator of the RFID communication system 1 about the failure of a component in the base station 2. Furthermore, the control unit 8 replaces in particular the active reader 6 with one of the inactive readers 7 automatically as soon as the reader 6 itself has failed or indicates a fault. The heartbeat bus 22 can here be a separate bus or part of the reader-selector bus 10. The readers 6, 7 are connected to the control unit 8 via dedicated lines or, as shown in FIG. 2, via a common data line 13. In addition, as suggested by the dashed lines, the GPIO ports 15, for instance, can optionally also be connected to the heartbeat bus 22 as additional components of the base station 2.

The sequence of the above-described switchover process is described below with reference to FIG. 3 and FIG. 4.

Figure 3:
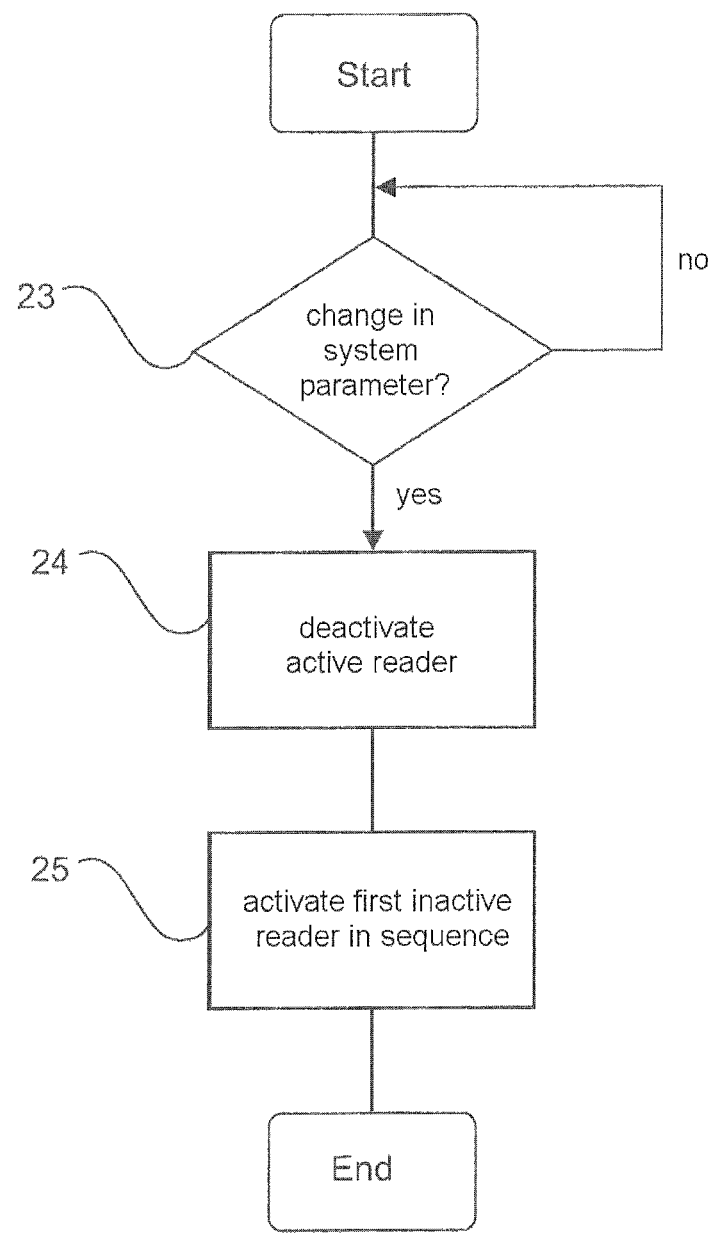
FIG. 3 shows a flowchart of a first embodiment of the method according to the invention for controlling an RFID communication system.

In an embodiment of the method as shown in FIG. 3, the base station 2 polls at least one system parameter, which initiates a switchover between readers 6, 7 in the base station 2. Said system parameter may be the regular signal on the heartbeat bus 22 or an external switching signal on the switching input 20. The external switching signal may indicate, for example, a change in the specified communication frequency or a change in an operating program version for one or more of the active readers 6. The system parameter is polled in a step 23. If there is no change in the monitored system parameter, i.e. the expected ready signals are arriving regularly on the heartbeat bus 22 and there is no command at all applied to the external switching input 20, then the method jumps back and repeats the polling for a change in the system parameter that requires a response.

As soon as there is a change in the system parameter and the replacement of the active reader 6 is detected in step 23, the active reader 6 is deactivated in step 24. The inactive (redundant) reader 7 is activated immediately afterwards in step 25. If there are a plurality of substitute devices available for selection, the device that is activated is the device identified as the next device to be used. In other words, if there are more than one inactive reader 7,7',7", . . . , the control unit 8 activates the next reader 7' in a specified sequence. Each activation of a device involves adopting the configuration of the failed active reader 6 by transferring the configuration data from the memory of the management system. Thus this transfer can also take place after the previously active reader 6 has failed. This configuration data, for instance, may relate to the number of antennas used, the maximum permitted transmit power, the antenna output power, the receive sensitivity, the selected frequency range and time limits for reading and/or transmitting, e.g. the "listen before talk" function, and other application-specific parameters known to a person skilled in the art.

For this purpose, before this failure such configuration data is already stored in the memory of the management system, for instance in the program/data memory 19, or in a temporary memory 35 described in FIG. 6 and FIG. 7 below, e.g. a memory of the reader-selector module 9, and is transferred to the previously inactive (redundant) reader 7 and now activated reader 6".

In the basic embodiment of the method, after a reader has been substituted the method is finished, and the method is terminated or jumps back (not shown) to the polling 23.

In order to avoid any downtime during substitution and switchover of devices, it can be provided that activation 25 of the inactive reader 7 is performed before deactivation 24 of the active reader 6. This method lends itself in particular to a scheduled stoppage of an active reader 6, which is arranged, for example, in order to perform a firmware update or operating-software update on this reader.

Thus two readers are active during a specified interval. Needless to say, during this time period the base station 2 outputs the output signal from only one of the two active readers. As already described above, the data is output at one or more output devices 16, 17, 18 via the GPIO port(s) 15.

For an unscheduled failure of an active reader 6, which may be caused by a fundamental software error or hardware fault, for example, the downtime largely depends on detection of this failure and also on the length of time for reconfiguring the redundant reader 7. As already mentioned, this reconfiguration is performed by uploading the configuration data for the failed reader from the memory of the management system, for example from the program/data memory 19, or a temporary memory 35 shown in FIG. 6 and FIG. 7, into the inactive (redundant) reader 7, which is then activated and becomes the active reader 6. The temporary memory 35 shown in FIG. 6 and FIG. 7 may be, for example, an integral part of the base station 2, preferably of the control unit 8 and for instance of the reader-selector module 9.

Figure 4:
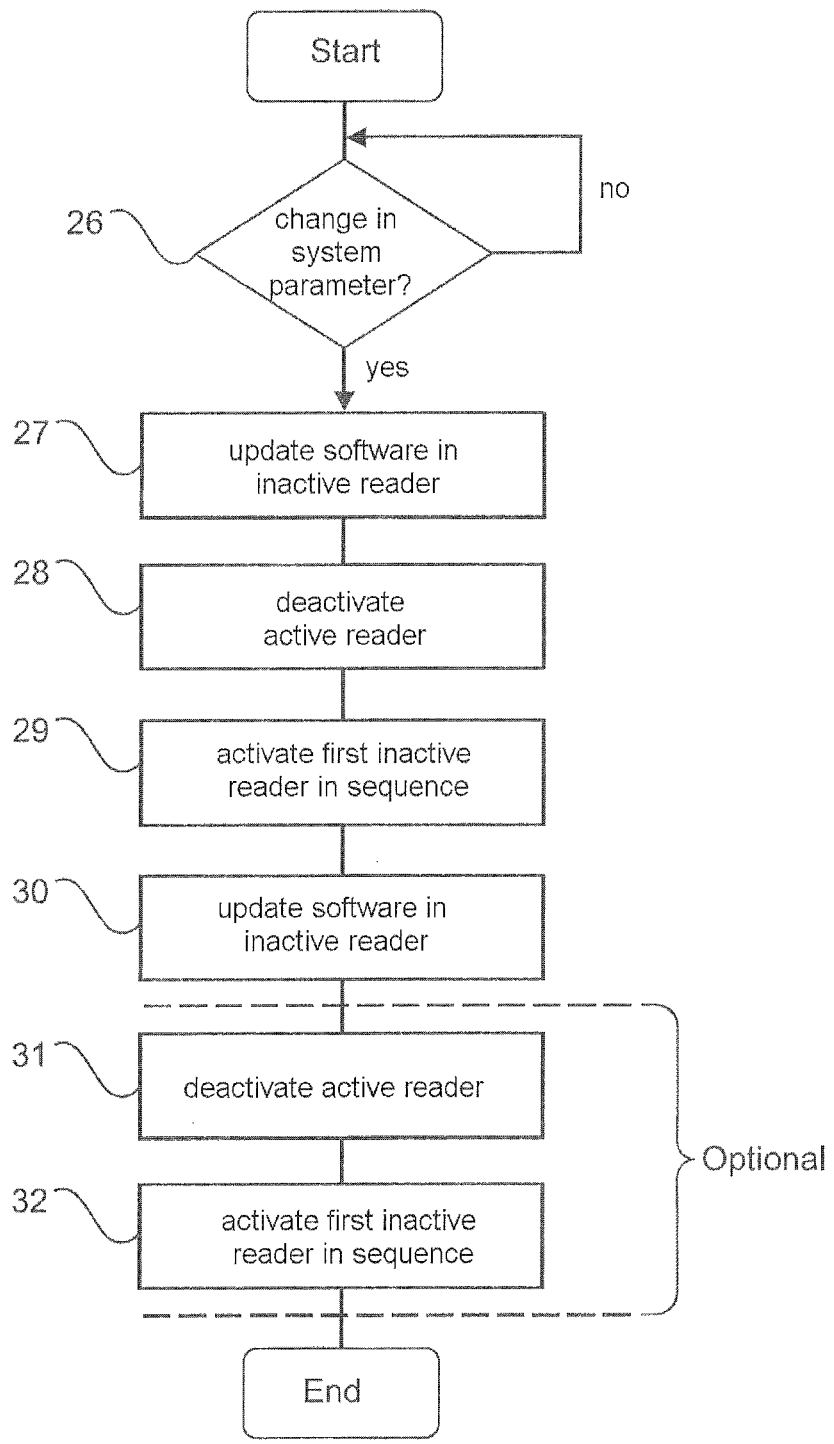
FIG. 4 shows a flowchart of another embodiment of the method according to the invention for controlling an RFID communication system.

FIG. 4 uses a flowchart to show a specific method for updating the software, in particular the firmware, of an active reader 6.

When a change is made to the firmware, i.e. to a fundamental piece of operating software, that affects all the readers, this is transferred to currently inactive readers. To ensure, however, that all the readers, i.e. inactive readers 7 and active readers 6, benefit from the firmware update, a dual switchover can be performed as presented below. In this process, the appropriate routing of the relevant input and output signals is not shown, because this has already been presented in FIG. 1b,c,d and can be applied to this embodiment.

First, a change in a system parameter is polled in step 26. In this case, the procedure is waiting specifically for an external command at the switching input 20 to update the firmware. When such a command arrives, the firmware is updated immediately, in step 27, in at least one inactive reader, preferably all the inactive readers 7. Then, in step 28, the currently active reader 6 is deactivated, and in step 29, an inactive reader 7 is activated in advance, simultaneously or with a minimum delay. In step 30, the firmware can now likewise be updated in the deactivated reader, previously 6, with the result that all the readers now have the latest version of the general firmware.

The method can therefore be terminated.

To restore the system to the condition prior to updating the software, however, the currently active reader 6" can also be deactivated again, in step 31, and an inactive reader activated in step 32. Of course the reader activated in step 32 is either the originally active reader 6 (provided it is operational again, e.g. after a software update) or a replacement device 7' used in its place (e.g. after a fault).

With step 32, the original condition of the RFID communication system 1 is restored and the method can now finally be terminated.

The invention is not restricted to the exemplary embodiments above. Other combinations are possible. Thus in another embodiment (not shown), in the event of a reader failing, the following procedure is intended to ensure a particularly fast response in order to guarantee continuous operation: The system comprising a multiplicity of readers 6, 7, 6',7', . . . is partitioned such that a set of two or more readers 6, 7 is grouped into a redundant unit. The total number of such units is m, and therefore in terms of function, m reader units are available to the system. In addition there is also a further (additional redundant) reader $7_{m+1}$. The number n of redundant readers is therefore n=m+1. Two readers 6, 7 connected in parallel with each other, specifically one active reader 6 and one redundant reader 7, each have the same configuration. The management system checks the operation of these readers using a heartbeat function. If the active reader 6 fails, then this is signaled to the operator of the system. The redundant reader 7 continues the operation. The associated configuration data is simultaneously transferred to the third redundant reader $7_{n+1}$, which then, possibly after a short time, is available as a redundant reader whereas the failed (previously active) reader 6 is removed, for instance, and can be checked. At the same time, a further reader should then be fitted again as the "new third" reader $7_{n+1}$, in order to restore the initial situation as quickly as possible. Hence using hardware of relatively low complexity it is possible to achieve a high degree of reliability and in particular a very fast response time after a failure, because this procedure dispenses with the initial transfer of the configuration data and, if applicable, also the routing.

Furthermore, as already described in detail above, a low-cost variant is also provided in which the base station 2 comprises more active readers 6 than inactive readers 7, and in particular a plurality of active readers 6 and only one inactive reader 7. The inactive reader 7 can then be provided to replace any one currently failed active reader 6 if required. In such an alternative embodiment, each active reader 6 is provided with at least one associated antenna 3 and a monitored area 4 specifically associated with the particular reader, which areas 4 do not overlap one another in order to avoid multiple detection of a specific RFID transponder 5.

Moreover, a compromise between a good level of redundancy and the associated costs can be provided by allowing any combination of active readers 6 and inactive readers 7 to be chosen, where any first number m of active readers 6 in a base station 2 can be combined with any second number n of inactive (redundant) readers 7 according to need.

Examples of the configuration of active and inactive readers according to the present invention and the prior art are explained below with reference to FIG. 5 to FIG. 7.

Figure 5A:
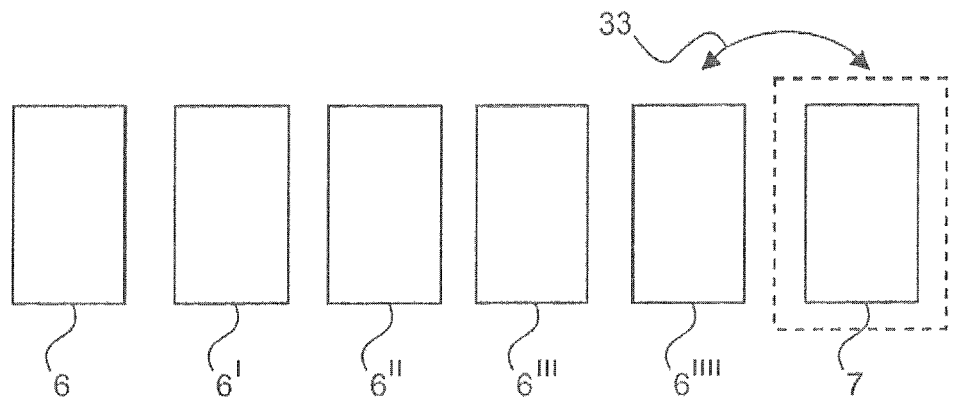
FIG. 5a, b, c show a possible combination of active and inactive readers using three alternative replacement processes.
Figure 5B:
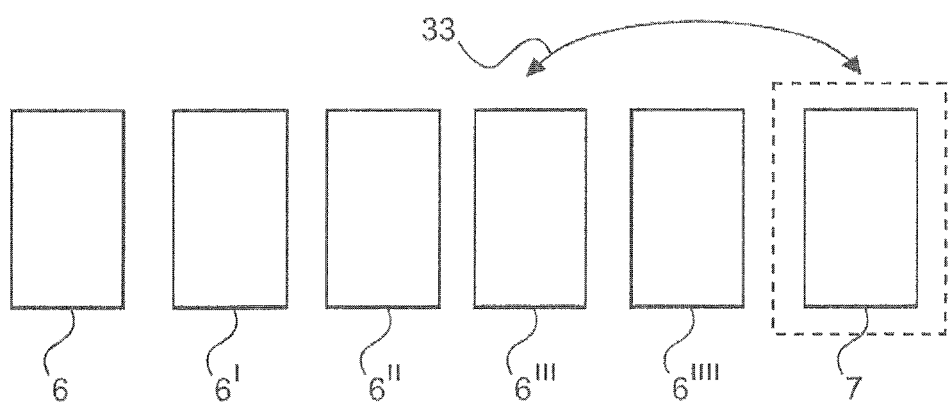
Figure 5C:
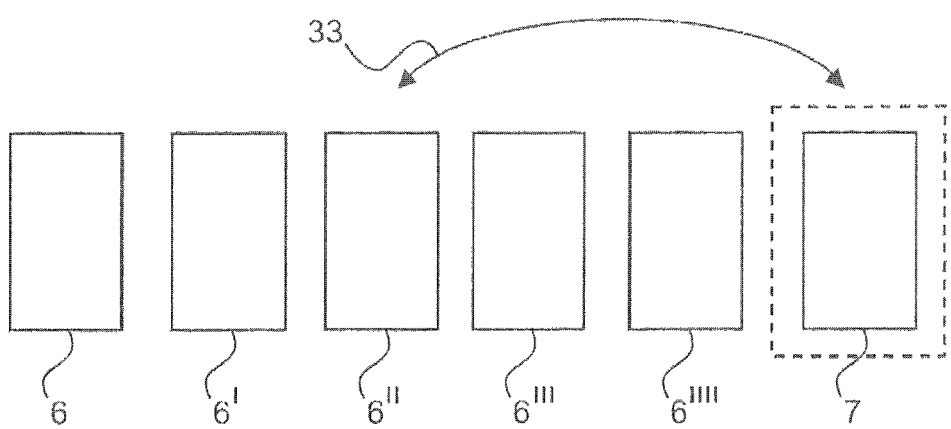

FIGS. 5a, 5b, and 5c show a possible combination of active readers 6 and inactive readers 7 using three alternative replacement processes. The example shows five active readers 6,6',6",6''',6'''', namely a first active reader 6, a second active reader 6', a third active reader 6", a fourth active reader 6''' and a fifth active reader 6'''', and one inactive reader 7. In FIG. 5 a, the fifth reader 6'''' is replaced by the previously inactive reader 7. This process of substituting active reader 6'''' and inactive reader 7 is indicated by a double-ended arrow 33. Since the substitution process 33 is not restricted to exchanging the reader 6'''' with the previously inactive reader 7, FIG. 5b shows the substitution 33 of the fourth reader 6''' with the previously inactive reader 7. FIG. 5c shows the substitution 33 of the third reader 6" with the previously inactive reader 7. The entire set of readers 6 comprising five single devices 6,6',6",6''',6'''' thus draws on only one (redundant) substitute device 7. Obviously also a plurality of substitute devices 7,7',7" can be kept ready rather than just one substitute device 7 in order to increase the redundancy and hence also provide cover for the failure of a plurality of active readers 6.

Figure 6:
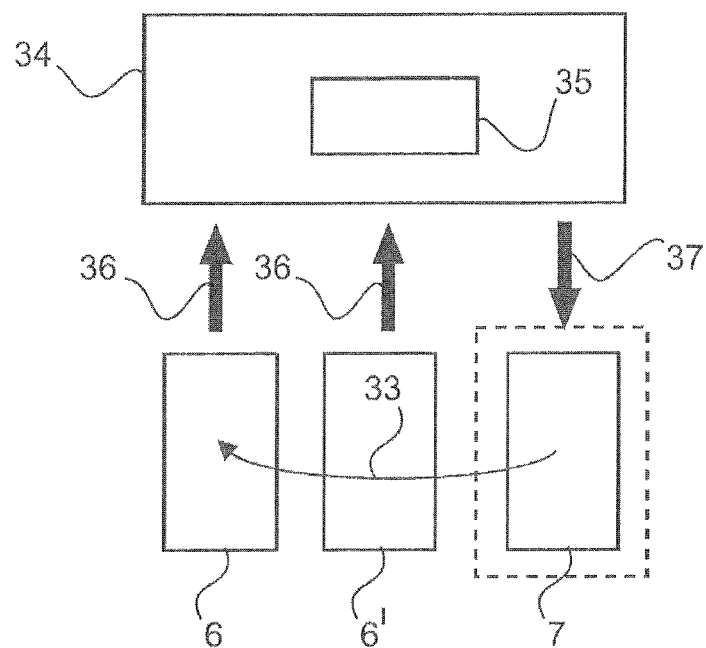
FIG. 6 shows the configuration-data traffic between a plurality of active and inactive readers and the management system according to the invention.

FIG. 6 shows the data traffic between the plurality of active readers 6,6' and inactive readers 7 and the management system that arises in the described substitution 33 of readers. In a first data transfer 36, configuration data specific to each individual active reader 6,6' is initially stored in a temporary memory 35 of the management system 34. If the configuration data is not yet held in the temporary memory 35, it is uploaded into the temporary memory 35 by the data transfer 36. This is done for each of the active readers 6,6' independently of one another.

If now as a result of an unforeseeable failure, the first active reader 6 is substituted by the inactive reader 7, then initially the associated configuration data is transferred from the configuration-data memory 35 of the management system 34 into the previously inactive (redundant) reader 7 by the data transfer 37. This ensures that the previously inactive device 7 is configured such that once it has been activated, it can seamlessly take over the functions of the reader 6 to be replaced.

Figure 7:
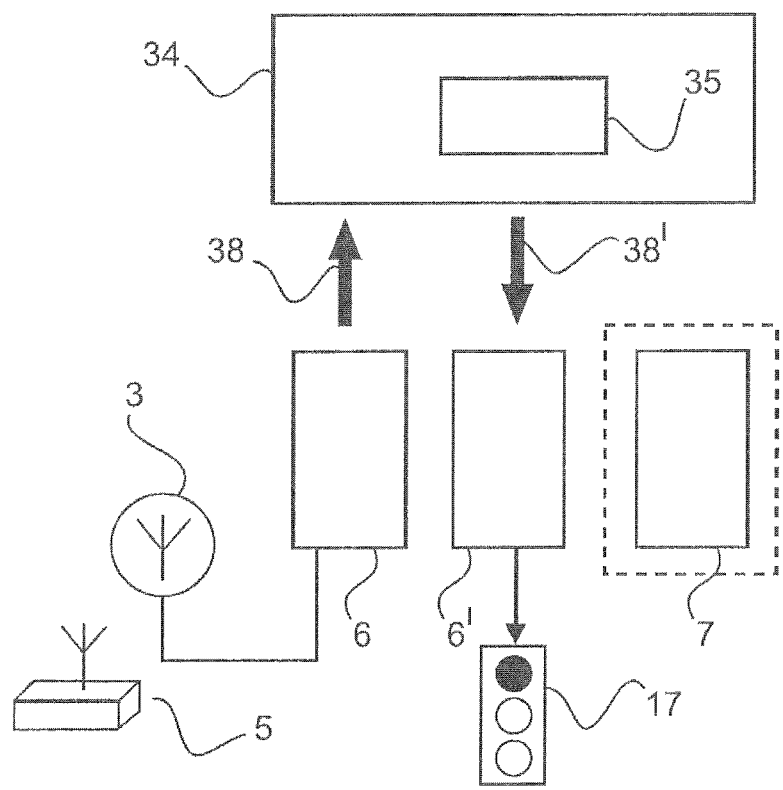
FIG. 7 shows the data traffic between a plurality of active and inactive readers and the management system according to the invention for the purpose of transferring signal data.

FIG. 7 shows data traffic between a plurality of active readers 6,6' and inactive readers 7 and the management system 34 according to the invention for the purpose of transferring signal data that originates from the RFID transponder 5 and, for instance, controls the access control mechanism 17. In this case, although said data is received by the first reader 6 using the antenna 3 connected thereto, this data is transferred via the management system 34 to the second active reader 6', and provided by this reader 6' at its output in order to control an access control mechanism 17.

This is particularly advantageous because the ports of all the active readers 6,6', . . . are thereby available to all the active readers 6 ,6', . . . . For example, the first active reader 6 can transmit signal data to the management system 34 by means of a suitable data transfer 38 for the purpose of controlling an access control mechanism 17. The signal data can then be transferred by the management system 34 to the second active reader 6' by a further data transfer 38', and can control the access control mechanism 17 connected to said second active reader. Hence the management system 34 also comprises for the signal data functionally a further part of the routing matrix 100, which part is suitable for transferring signal data from the at least one RFID transponder 5 between at least two active readers 6,6' and to the outputs thereof if applicable. Thus this constitutes a routing matrix for inputs and outputs of all the active readers 6, by means of which the signal data from the transponder 5 can be received by a reader 6 and transferred to the free outputs including of other active readers 6',6'',6''',6'''' . . . in a manner that can be configured to suit. This is particularly advantageous because it allows more efficient use of the resources of all the active readers 6.

LIST OF REFERENCES

1 RFID communication system
2 base station
3 antenna
4 communication area
5 RFID transponder
6 active reader
7 inactive reader
8 control unit
9 reader-selector module
10 reader-selector bus
11 antenna switch
12 data port, 12a output bus, 12b internal bus
121,122 inputs of the data port
13 data line
14 external database, middleware device
15 GPIO port, 15a GPIO contact
16 output device having display device from GPIO, 16a first bus, 16b second bus
17 access control from GPIO
18 blocking mechanism from GPIO
19 program/data memory, 19a memory bus
29 external switching input
21 antenna outputs
22 heartbeat bus
23 change in system parameter?
24 deactivate the active reader
25 activate an inactive reader
26 change in system parameter?
27 update software in inactive reader
28 deactivate the active reader
29 activate an inactive reader
30 update software in inactive reader
31 deactivate the active reader
32 activate an inactive reader
33 substitute active and inactive reader
34 management system
35 temporary memory, configuration-data memory
36 data transfer of the configuration data from the active reader to the management system
37 data transfer of the configuration data from the management system to the inactive reader
38 transfer of signal data from the RFID transponder between the readers and the management system
100 routing matrix
101/102 parts of the routing matrix

The invention claimed is:

1. A radio frequency identification (RFID) communication system, which comprises:
at least one active reader for identifying at least one RFID transponder, and at least one inactive reader, wherein the RFID communication system also comprises a management system, which comprises the following:
at least one management data bus, via which the management system is in bidirectional data communication with the readers;
at least one memory for uploading and storing configuration data from each active reader;
at least one control unit
for polling an activity status for each active reader at regular time intervals,
in the event of an active reader failing, for identifying the failed reader and loading the configuration data for the failed reader from the memory into a specified inactive reader, and
for activating the specified inactive reader in place of the failed reader to identify the at least one RFID transponder.

2. The RFID communication system as claimed in claim 1, wherein the management system comprises a digital routing matrix, which is used to connect to one another or disconnect from one another in a signal flow of inputs and outputs of individual components of the RFID communication system, selected from outputs of antennas and antenna inputs of the readers, and the outputs of the readers and inputs of a data port.

3. The RFID communication system as claimed in claim 2, wherein the routing matrix is additionally suitable for transferring signal data from the at least one RFID transponder between at least two active readers from an input of an active reader to an output of another active reader.

4. The RFID communication system as claimed in claim 1, wherein a number (n) of inactive readers is less than a number (m) of active readers.

5. The RFID communication system as claimed in claim 1, wherein a number (n) of inactive readers equals a number (m) of active readers.

6. The RFID communication system as claimed in claim 1, wherein a number (n) of inactive readers is greater than a number (m) of active readers.

7. The RFID communication system as claimed in claim 1, wherein the management system comprises a control unit, and that the control unit comprises a reader-selector module, wherein the reader-selector module is connected via a reader-selector bus to the readers to the at least one active reader and the at least one inactive reader in order to be able to activate and deactivate the readers by said control unit.

8. The RFID communication system as claimed in claim 7, wherein the control unit comprises at least one general purpose input/output (GPIO) port, which is suitable for outputting at least one output signal to one or more output devices according to an identification signal from the at least one RFID transponder or for transferring software/firmware to inactive readers.

9. The RFID communication system as claimed in claim 1, further comprising a base station having at least two inactive readers, and the control unit is designed to activate the at least two inactive readers in a specified sequence.

10. The RFID communication system as claimed in claim 9, wherein the control unit is designed to activate the or an inactive reader before deactivating the or an active reader, with the result that at least two readers are active during a specified period, wherein the base station outputs an output signal only from one of these two active readers.

11. The RFID communication system as claimed in claim 1, wherein the communication system has an external switching input for an external switching signal as a system parameter.

12. The RFID communication system as claimed in claim 11, wherein the external switching signal is suitable for indicating a change in a specified communication frequency.

13. The RFID communication system as claimed in claim 12, wherein the external switching signal is suitable for indicating a change in an operating program version for one or more of the at least one active reader and the at least one inactive reader.

14. The RFID communication system as claimed in claim 11, wherein the external switching signal is suitable for indicating a change in an operating program version for one or more of the at least one active reader and the at least one inactive reader.

15. The RFID communication system as claimed in claim 1, wherein the RFID communication system has a system parameter comprising a heartbeat signal being a ready signal from all the readers.

16. A method for controlling radio frequency identification (RFID) communication system comprising an active reader, which is suitable for identifying at least one RFID transponder, and comprising at least one inactive reader, wherein the method comprises the following steps:
    uploading and storing configuration data from each active reader into a memory of the management system;
    a control unit polling an activity status for each active reader at regular time intervals and
    in the event of an active reader failing, identifying the failed reader and loading the configuration data for the failed reader from the memory into a specified inactive reader; and
    activating the specified inactive reader in place of the failed reader to identify the at least one RFID transponder.

17. The method as claimed in claim 16 wherein on activation of the specified reader, the following method step is performed:
    a routing matrix routing inputs or outputs of the previously inactive reader in order to replace the failed, previously active reader in a signal flow of the RFID communication system.

18. The RFID communication system as claimed in claim 17, wherein the RFID communication system transfers signal data from the at least one RFID transponder between at least two active readers.

19. The RFID communication system as claimed in claim 16, wherein the RFID communication system transfers signal data from the at least one RFID transponder between at least two active readers.

20. The method as claimed in claim 16, wherein the control unit activates at least two inactive readers in a specified sequence.

21. The method as claimed claim 16, wherein an external switching signal is polled as a system parameter.

22. The method as claimed in claim 21, wherein the external switching signal indicates a change in an operating program version for one or more of the at least one active reader and the at least one inactive reader.

23. The method as claimed in claim 22, in which as the system parameter, a ready signal from components of the RFID communication system, comprising an activity status of each of the active readers, is polled, wherein the ready signal is a heartbeat signal.

24. The method as claimed in claim 21, in which as the system parameter, a ready signal from components of the RFID communication system, comprising an activity status of each of the active readers, is polled, wherein the ready signal is a heartbeat signal.

* * * * *